United States Patent [19]

Atsukawa et al.

[11] 3,898,320
[45] Aug. 5, 1975

[54] DRY ABSORBENT COMPOSITION AND PROCESS FOR MAKING THE SAME

[75] Inventors: Masumi Atsukawa; Yoshihiko Nishimoto; Kazuhiro Matsumoto, all of Hiroshima, Japan

[73] Assignee: Mitsubishi Jukogyo Kabushiki Kaisha, Japan

[22] Filed: Feb. 16, 1973

[21] Appl. No.: 333,171

Related U.S. Application Data

[63] Continuation-in-part of Ser. No. 96,162, Dec. 8, 1970, Pat. No. 3,798,310, which is a continuation of Ser. No. 864,961, Oct. 6, 1969, abandoned, which is a continuation of Ser. No. 548,340, March 4, 1966, abandoned.

[30] Foreign Application Priority Data

Mar. 24, 1965   Japan.............................. 40-17091

[52] U.S. Cl. ................. 423/605; 423/548; 252/471
[51] Int. Cl............................................ C01g 45/02
[58] Field of Search................... 423/605, 244, 548; 252/471

[56] References Cited
UNITED STATES PATENTS
2,122,735   7/1938   Bellone.............................. 423/605

OTHER PUBLICATIONS

Uno et al., "A New Dry Process of $SO_2$ Removal From Flue Gas," Proceedings, 7th World Petroleum Congress, Vol. 9, pp. 289–295, Elsevier Publishing Company, Ltd., 1967.

*Primary Examiner*—Earl C. Thomas
*Attorney, Agent, or Firm*—McGlew and Tuttle

[57] ABSTRACT

A process of making an economically-attractive sulfur oxide absorbent is provided, the absorbent being an activated dry hydrated-manganese oxide characterized by electron microscope-determination in form of microscopic particles of one or more of string, or plate, or foil shape, and having 4.6 or 7.18 angstroms distance between atomic planes at maximum defraction strength of line. The size of the microscopic particles ranges from about 0.1 to about 5.0 micron in diameter. The absorbent is essentially manganese oxide of the formula $MnO_{1+i} \cdot XH_2O$, where $i$ is from 0.5 to 0.8 and X is from 0.3 to 1.0. The absorbent has a bulk density of from about $0.337 g/cm^3$ to about $0.625 g/cm^3$, and a surface area of from about $125 m^2/g$ to about $135 m^2/g$. A preferred cyclic process employs pressurized air or oxygen bubbles of small size to thereby rapidly oxidize an aqueous mixture of manganese sulfate and an excess of ammonium hydroxide to yield the desired absorbent and results in an industrially attractive process which is economical and efficient.

11 Claims, 3 Drawing Figures

PATENTED AUG 5 1975    3,898,320

DRY ABSORBENT COMPOSITION AND PROCESS FOR MAKING THE SAME

CROSS-REFERENCE TO PRIOR APPLICATIONS

This is a continuation-in-part of our co-pending Application Ser. No. 96,162, filed Dec. 8, 1970, now U.S. Pat. No. 3,798,310, which in turn was a continuation of Application Ser. No. 864,961, filed Oct. 6, 1969, now abandoned, which in turn was a continuation of Application Ser. No. 548,340, filed on Mar. 4, 1966, now abandoned.

BACKGROUND OF THE INVENTION AND PRIOR ART

1. Field of the Invention

This invention generally relates to a novel dry absorbent useful in the removal of sulfur dioxide contaminants and/or sulfur trioxide contaminants hereafter collectively referred to as sulfur oxides, from effluent waste and/or off-gases from various industrial processes or systems. As contrasted to prior belief that manganese oxide absorbant for commercially feasible processes was unacceptable because of its unacceptably low capacity for sulfur oxide(s) absorption in conjunction with its high cost of production, the dry absorbent of the invention overcomes these objections.

Considered from another aspect, the invention is concerned with a process for the preparation of the novel manganese oxide composition.

The inventive absorbent composition is especially useful in a gas purification process for the removal of sulfur oxides from a gas flow in a dry process, wherein the gas flow or stream from which the sulfur oxides are to be removed, is contacted with activated hydrated manganese oxide in powder form. This process is described and claimed in co-pending Application Ser. No. 96,162 filed on Dec. 8, 1970.

2. Prior Art

With a view of reducing air pollution, sulfur oxide containing waste gases are generally subjected to a sulfur oxide removal treatment with the manganese oxide absorbent of the invention before being released to the atmosphere. For this purpose, numerous processes have been developed by means of which the sulfur oxides are eliminated from the waste gas in a more or less quantitative and economic manner. The most common sulfur oxide removal processes are wet processes, wherein the waste gas flow is washed with an aqueous solution, to remove the sulfur oxides from the gas. These prior art wet processes are not suitable for removing sulfur oxides from large volumes of waste gases as they are generated in large-sized plants. This is primarily due to the fact that, after the waste gas flow has been wet-treated by passing it through an aqueous solution, the temperature of the gas flow is reduced and the moisture content in the gas is increased to such an extent that the gas, upon subsequent release to the atmosphere, does no longer properly diffuse. For this reason, dry gas purification processes have been suggested, wherein the sulfur oxides are removed by a solid-gas contact between the gas flow and a solid absorbent or adsorbent.

Various reactants have been suggested for the removal of sulfur oxides from a gas flow in a dry process. Active carbon, silica gel and specific ion-exchange resins have thus been proposed for this purpose. In these processes, the reactant acts in the manner of adsorbent. A dry absorption process in which an alkalized alumina or metallic oxide is used has also been suggested.

However, experience has demonstrated that these prior art adsorption processes are difficult to carry out successfully, primarily due to the rather poor adsorption ability of the adsorbents for dilute $SO_2$ at temperatures above 100°C. Further, the adsorbents proper are expensive and there are considerable difficulties and expenditure to regenerate the spent adsorbents. For this reason, the prior art dry adsorption processes of the indicated kind have not proved to be satisfactory and have therefore not found proper recognition in the industry.

Although the dry absorption process previously referred to, in which alkalized alumina or metal oxides are used, is suitable for the removal of sulfur oxides from a gas flow at temperatures above 100°C, iron oxide, magnesium oxide, and calcium oxide, which are customarily used in this dry process, are effective to absorb sulfur oxides at temperatures below 300°C.

According to a more recent proposal, alkalized alumina and manganese oxide are used as absorbents in dry processes for eliminating sulfur oxides from gases at temperatures between 100° and 300°C. However, the use of alkalized alumina for the indicated purpose is disadvantageous, because the spent alumina can only be regenerated by a reducing gas at 500° to 600°C, which renders the process prohibitively expensive.

It is known that manganese oxide absorbent compositions prepared under the following specific conditions have an absorption capacity for sulfur dioxide and sulfur trioxide, but less absorption capacity than the manganese oxide hydrate prepared according to this invention. The prior art manganese oxides jointly have such low efficiency and high cost of manufacture and/or regeneration of the manganese oxide as to make prior processes and absorbents economically unattractive. Thus, opposite to a low efficiency in sulfur oxide absorption capacity taught by prior art, and opposite to the expected prior art high cost processes, the novel absorbent composition at this invention is unexpectedly useful in a low cost process since the novel absorbent of this invention has an unexpectedly high absorption capacity for sulfur oxides, as well as different physical properties from the prior known forms of manganese oxide absorbent compositions. Typical prior art absorbent compositions are as follows:

1. Manganese oxide ($MnO_{1.88}$ having about 2.392 angstroms distance between atomic planes at maximum defraction strength of line, and being a $\gamma$-manganese oxide) is obtained by adding ammonium persulfate to manganese sulfate, to form a precipitate, which upon filtering and rinsing with water is dried at 130° C.

2. Manganese oxide ($\gamma$-$Mn_2O_3$ has a low sulfur-oxide-absorption capacity, and the mono-hydrated form $\gamma$-$Mn_2O_3 \cdot H_2O$) has a microscopic-particle shape of "needle-shaped" configuration; the $\gamma$-$Mn_2O_3$ absorbs merely about 24% (out of 100% sulfur oxide) which is low relative to the present invention) and is obtained by adding sodium hydroxide to manganese sulfate to form a precipitate. The precipitate, upon filtering and rinsing, is dried, whereupon it is heated in an air stream to about 300°C. The product is then heat-treated under reduced pressure at a temperature between 300°–400°C. The ratio of oxygen atoms to manganese atoms ranges from about 1.47 to about 1.48.

3. Electrolytic manganese oxide (i.e., $\gamma\text{-}MnO_{1.88}$ characterized by very minor (low) — almost no — sulfur oxide absorption capacity, such as about 10% is obtained by electrolyzing a manganese sulfate solution to form a deposit on an anode. This deposit, upon washing and drying, is heat-treated under reduced pressure at a temperature of between 300°–400°C.

4. Manganese oxide (i.e., $\gamma\text{-}Mn_2O_3$, also having a very low sulfur oxide removal capacity, and when hydrated — i.e., when $Mn_2O_3 \cdot H_2O$ — having microscopic needle-shaped particles) is obtained from a deposit formed at the cathode, according to the procedure described above. The deposit is first washed and dried and is then heated to 300°C, and afterward, it is heat-treated at the same temperature under reduced pressure.

However, the prior art manganese oxide absorbent compositions, hereinabove discussed, are prohibitively expensive to produce, particularly in large quantities as required when large volumes of waste gases are to be treated. Also, these prior art absorbents have low absorption capacity for sulfuroxide gases. This is so, for example, because expensive chemicals are necessary to arrive at the required manganese oxides and, as will have been noted from the above, expensive electrolytic procedures and vacuum conditions, as well as high temperature treatments with hot gases are necessary.

OBJECTS OF THE INVENTION

Accordingly, it is a primary object of this invention to overcome the drawbacks of the prior art absorbent compositions and to provide a novel manganese oxide absorbent composition which is useful in a dry process for the removal of sulfur oxides from a flow of waste gas. Such an absorbent is an activated hydrated manganese oxide of special physical properties which has superior absorption activity in respect to the sulfur oxides, and which can be easily regenerated and thus recycled to the sulfur oxide removal process and further, which can be produced and regenerated in an inexpensive and simple manner.

Another object of the invention is to provide a cyclic or continuous process, wherein the novel absorbent of the invention is inexpensively produced as an activated hydrated manganese oxide of special physical properties and wherein ammonium sulfate is obtained and separated as another product.

A still further object of the invention is a process in which the active, hydrated manganese oxide absorbent of the invention reacts with the sulfur oxides in a waste gas to form manganese sulfate and in which, thereafter, by means of ammonia and oxygen or an oxygen-containing gas, the manganese sulfate is converted into ammonium sulfate and active hydrated manganese oxide, which latter is recycled for reaction with a fresh amount of waste gas flow.

Generally, it is an object of this invention to improve on the art of producing absorbent compositions for sulfur oxide removal from waste gas flows as presently practiced.

For a better understanding of the invention, its operating advantages and specific objects attained by its use, reference is made to the accompanying drawings in which there are illustrated and described preferred embodiments of the invention.

Figure 1:
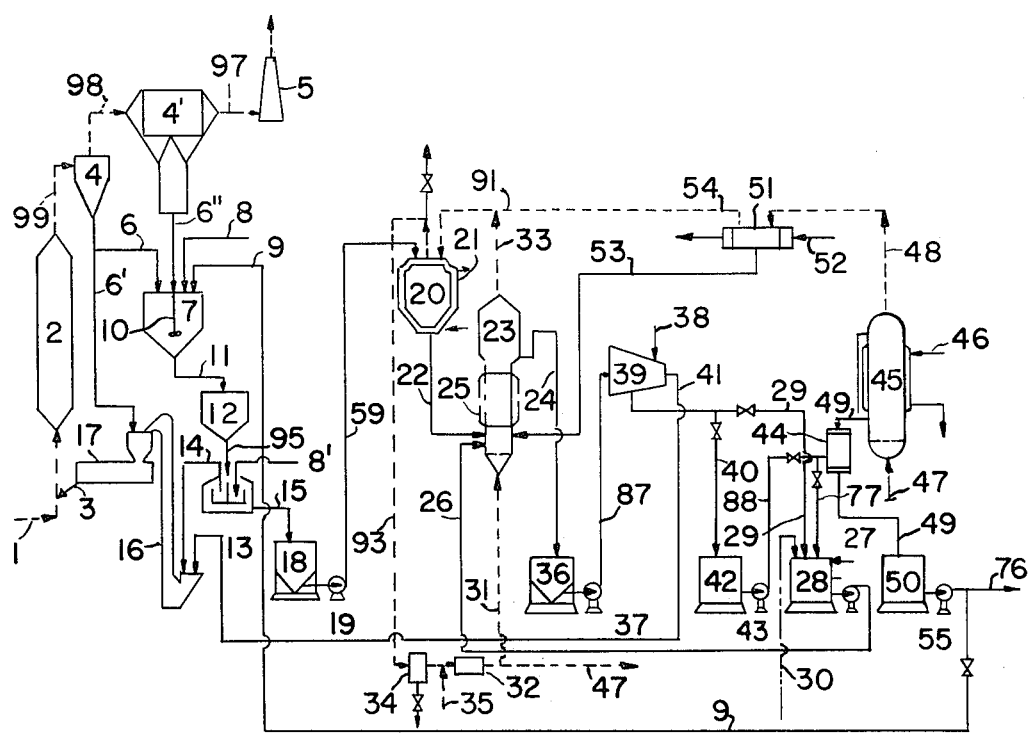
FIG. 1 is a diagrammatic representation of one embodiment of a plant for carrying out the inventive gas purification process in a continuous manner in which the novel absorbent compositions are made by reaction of manganese sulfate and used for purification.

Referring now to the drawings, FIG. 1 indicates diagrammatically a plant for removing sulfur oxides from a waste gas flow by means of the activated hydrated manganese oxide composition of the invention which is characterized (1) by microscopic particles ranging from 0.1 to 5 micron in diameter and of at least one of the following shapes: string shape, plate shape, and foil shape, and (2) by the formula: $MnO_{1+i} \cdot XH_2O$ wherein $i$ ranges from about 0.5 to about 0.8 and X ranges from about 0.1 to about 1.0, and (3) by 4.6 or 7.18 angstroms distance between atomic planes at maximum defraction strength of line. This manganese oxide composition is made by reaction at a predetermined cooled temperature, e.g., 20° or 30°C, between aqueous manganese sulfate solution, ammonium hydroxide, and oxygen. The absorbent composition is preferably made by a reaction consisting of rapid oxidation by bubbling pressurized oxygen-containing gas bubbles through a mixture of the ammonium hydroxide present in at least about a stoichiometric amount with the aqueous manganese sulfate solution, the bubbles ranging substantially each respectively from about 0.2 to about 5.0 millimeters in diameter, with the predetermined temperature ranging from about 10° to about 45°C. The absorbent so produced is used in contacting sulfur oxide gases by dispersing particles of absorbent in a flow of the sulfur oxide-containing gas. The novel activated hydrated manganese oxide absorbent is characterized by having from about 0.2 greater (i.e., 20% greater) to about 10 times greater absorption capacity for suflur oxide than the prior art manganese oxides previously made and employed in the heretofore inefficient and costly prior art processes; the manganese oxide and the sulfur oxides form manganese sulfate which is thereafter used to make the novel activated manganese oxide absorbent of the invention and ammonium sulfate.

A flow of $SO_2$ and $SO_3$ containing gas, which emanates from a plant producing such gas, is conveyed through conduit 1 into a solid gas contacting apparatus or column 2. The solid gas contacting apparatus 2 contains an absorbent in the form of hydrated manganese oxide of a specific formulation to be explained below, whereby the $SO_2$ and $SO_3$ are absorbed by or react with the hydrated manganese oxide to form manganese sulfate. The absorbent, to wit, the hydrated manganese oxide, is supplied to the contact apparatus 2 from a supply container 17 which feeds the absorbent in powder form into the waste gas flow below the contact apparatus 2, as indicated by the arrow 3. The absorbent material could, of course, be fed directly into the contact column 2. The waste gas exits through an outlet provided at the top of the column 2 and flows through line 99 into a separator or dust collector 4 and from there through line 98 into separator or dust collector 4'. The waste gas then passes through conduit 97 into the chimney 5 from where the purified waste gas is discharged to the atmosphere.

The waste gas flow exiting through line 99 from the contact apparatus 2 carries along the manganese sulfate which has been formed in the column and also unreacted manganese oxide, to wit, the absorbent. The manganese sulfate and the unreacted absorbent are deposited in the dust collectors 4 and 4', then a portion of the deposit collected in the collector 4 and all of the deposit in the collector 4' are conveyed from the respective dust collectors through lines 6 and 6'', respectively, into a leaching container 7. A residual amount of the deposit in the collector 4 is fed back to the supply container 17 through line 6'. The leaching container is provided with an agitator 10 as indicated in the drawings. Water is supplied to the leaching container 7 through line 8. Instead of water, an ammonium sulfate solution may be introduced into the leaching container 7 through line 9 which latter connects to a collecting tank 50 to be described hereinbelow. The amount of water or aqueous ammonium sulfate solution supplied to the leaching container 7 should be sufficient so as to dissolve the manganese sulfate which has been supplied through lines 6 and 6'' while, of course, the manganese oxide, to wit, unreacted absorbent, will remain in solid form. The dissolution of the manganese sulfate is facilitated by the provision of the agitator or mixer 10. The leaching of the material in the leaching container 7 thus results in the formation of a suspension, the liquid phase of which consists of dissolved manganese sulfate, which may be enriched by ammonium sulfate in the event that ammonium sulfate solution has been supplied through line 9, while the solid phase is unreacted oxide. This suspension is withdrawn from the bottom of the leaching container 7 through line 11 and is fed into a storage vessel 12. The contents stored in the vessel 12 may at any suitable time be conveyed through line 95 into a solid-liquid separator 13. The solid material in the suspension, to wit, the unreacted manganese oxide, is conveyed from the separator 13 through conduit 14 onto a conveyor diagrammatically indicated by reference numeral 16 and from there into the supply receptacle 17 previously discussed. The unreacted absorbent, prior to being fed into the supply container 17, is washed with water supplied to the separator 13 through line 8'. From the container 17, in which the hydrated active manganese oxide is stored in powder form, the latter is recycled to the process as indicated by the arrow 3.

The aqueous manganese sulfate solution, which may be enriched by ammonium sulfate solution as set forth hereinabove, is discharged from the separator 13 through line 15 and is stored in a collecting vessel 18. This solution is then fed from the vessel 18 through line 59 into a tank 20. A pump 19 is connected in the line 59 to facilitate the transportation of the solution from vessel 18 into tank 20. Tank 20, is, in fact, an ammonia recovering tank, as will become apparent from the following description and is equipped with a cooling jacket 21 through which cooling water circulates. In this manner, the temperature within the tank 20 can be maintained below a predetermined maximum temperature. Both ammonia and oxygen are supplied to the tank 20 through line 91 as will appear more fully from the subsequent description. The manganese sulfate solution supplied to tank 20 through line 59 is partially converted in the tank into the mixture of manganese hydroxide and lower manganese oxides, while the sulfate moiety is converted into ammonium sulfate. The mixture formed in the tank 20 is conveyed through line 22 into an oxidation column, generally indicated by reference numeral 23, wherein the manganese hydroxide is further oxidized into activated hydrated manganese oxide. The oxidation column 23 is supplied with ammonia which emanates from a tank 28 which latter is supplied with gaseous ammonia through line 30 and with an aqueous solution which, in fact, is a wash solution obtained from washing the activated hydrated manganese oxide in the solid-liquid separator 39 to be discussed hereinbelow. The wash solution flows to the tank 28 through line 29, while the ammonium hydroxide ($NH_4OH$) formed in the tank 28 is conveyed from the tank through line 26 into the oxidation column 23. The oxidation column 23 has a cooling jacket 25. The tank 28 is equipped with a cooling pipe diagrammatically indicated by reference numeral 27 to reduce the temperature in the tank during the reaction of the gaseous ammonia supplied through line 30 with the aqueous was solution entering the tank through line 29.

The oxidizing agent, such as air, but preferably oxygen gas, is supplied to the oxidation column 23 through line 31 from compressor 32 in the form of fine bubbles which are formed by passing the oxygen through a gas dispersion device. Unreacted oxygen exits through the top of column 23 through line 33. This unreacted oxygen contains ammonia. After the ammonia has been removed from this gas mixture, which is accomplished by passing the mixture from line 33 through line 91 into the ammonia recovery tank 20, the pure oxygen is discharged from tank 20 through line 93 into a mist separator 34 and from there back into the compressor 32. Supplemental oxygen may be supplied through line 35.

The oxidation product obtained in the column 23 is withdrawn from the column through line 24 and stored in cell 36. This oxidation product is thus a suspension or dispersion essentially consisting of ammonium sulfate solution and solid hydrated manganese oxide. This material is then fed from cell 36 into the solid-liquid separator 39 through line 87, the feeding of the suspension from cell 36 to the separator 39 being facilitated by the interposition of the pump 37. Water is supplied to the separator 39 through line 38 to wash the cake of manganese oxide and the suspension is thus separated in the separator 39 into an ammonium sulfate solution, a wash liquid 29 and activated or active hydrated, to wit, water-containing manganese oxide. Alternatively, instead of discharging filtrate ($(NH_4)_2SO_4$) from the separator 39 through the same line 29 and thence through line 40 to the cell 42, the line 40 may run directly from separator 39 and the wash liquid is not discharged through the same line. The activated water-containing manganese oxide is fed through line 41 back onto the conveyor 16 and from there into the storage or supply container 17 which already contains the hydrated manganese oxide which has been fed into the container through line 14 from the separator 13.

The wash liquid is fed through line 29 into the tank 28 where, as previously mentioned, this liquid absorbs gaseous ammonia supplied through line 30.

The ammonium sulfate solution, in turn, is discharged through line 40 into a cell 42. Since the ammonium sulfate solution contains ammonia, the liquid from cell 42 is conveyed through line 88 and through a heat exchanger 44 into a column 45. A pump 43 is interposed between the cell 42 and the heat exchanger 44 in order to facilitate the feeding. A portion of ammonium sulfate solution may be fed through line 77 into the ammonium hydroxide producing tank 28. Steam is introduced into the column 45 through steam line 46, while oxygen emanating from the compressor 32 is blown into the column through line 47. Due to the heat treatment to which the solution is subjected in the column 45 and the introduction of oxygen, ammonia is released. The released ammonia exits through line 48 and is cooled in a condenser 51 by means of cooling water which is introduced through line 52. In this manner, ammonium hydroxide ($NH_4OH$) is formed which is discharged from the condenser 51 through line 53 and enters the oxidizing column 23 as previously explained. Oxygen gas which exits from the column 45 through line 48, in conjunction with the released ammonia, in turn, is discharged from the condenser 51 through line 54. This oxygen which thus contains some amounts of ammonia flows through line 54 into line 91 from whence it enters the ammonia recovery tank 20. As previously set forth, oxygen emanating from column 23 through line 33 also enters the tank 20 through line 91. After the ammonia has been removed from the oxygen which enters through line 54, the latter is recycled to the compressor 32 through line 93.

The ammonium sulfate solution remaining within the column 45 is discharged through line 49 and, at this stage, is thus devoid of free ammonia. The discharged solution is cooled by heat exchange in the heat exchanger 44 which is accomplished with the incoming solution pumped by pump 43 from the cell 42 through line 88 into the heat exchanger 44. The ammonium sulfate solution then flows through line 49' into the ammonium sulfate storage tank 50. In the event that ammonium sulfate is supplied to the leaching container 7, ammonium sulfate may be withdrawn from the storage vessel 50 through line 9 to be fed into the vessel 7, as previously explained. For this purpose, a pump 55 may be provided to facilitate the feeding. Excess amount of ammonium sulfate may be discharged from the tank 50 through line 76.

The following reactions take place in the inventive process:

Formation of Manganese Sulfate

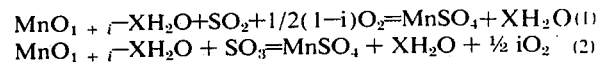
$$MnO_{1+i}\cdot XH_2O+SO_2+1/2(1-i)O_2 = MnSO_4 + XH_2O \quad (1)$$
$$MnO_{1+i}\cdot XH_2O + SO_3 = MnSO_4 + XH_2O + \tfrac{1}{2}iO_2 \quad (2)$$

Production of Manganese Oxide Absorbent Composition

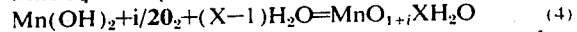
$$MnSO_4+2NH_4OH = Mn(OH)_2 + (NH_4)_2SO_4 \quad (3)$$
$$Mn(OH)_2 + i/2O_2 + (X-1)H_2O = MnO_{1+i}\cdot XH_2O \quad (4)$$

The inventive absorbent composition and process has many advantages which may be briefly summarized as follows:

1. The absorbing capacity of the invention hydrated manganese oxide in respect to $SO_2$ and $SO_3$ is superior to that of manganese oxides produced according to conventional prior art processes. The manganese oxide absorbent composition of this invention can be readily and quickly formed in a relatively inexpensive and simple manner and the so formed material may then be recycled to the sulfur oxide absorption process. For the purpose of formation, oxygen or an oxygen-containing gas, as seen in Formula 4 may be used. By selecting suitable reacting conditions, excellent results are obtained without requiring expensive chemicals as oxidizing agents.

2. Ammonium sulfate of high purity is produced as a by-product which is of economic importance.

3. Upon adding ammonium hydroxide to the manganese sulfate which has been formed as a result of the reaction of the manganese oxide with the sulfur oxides, manganese hydroxide is formed as shown in the above Formula (3). Upon oxidizing the manganese hydroxide into activated hydrated manganese oxide, according to Formula 4, the reactivity of the hydrated manganese oxide in respect to $SO_2$ and $SO_3$ may be varied in accordance with the kind and nature of the oxidizing agent used, the alkali concentration, the reaction temperature and the reaction period.

Figure 2:
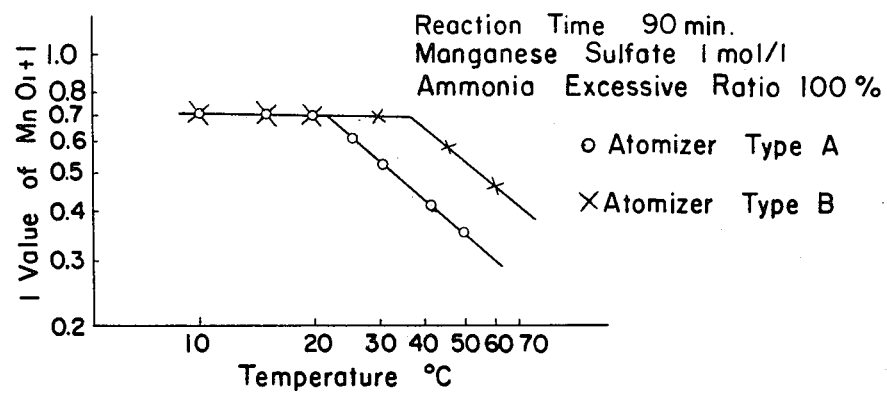
FIG. 2 is a graph on which the relationship between the $i$ values, as hereinafter defined, of $MnO_{1+i}$ and the regeneration temperatures is plotted.
Figure 3:
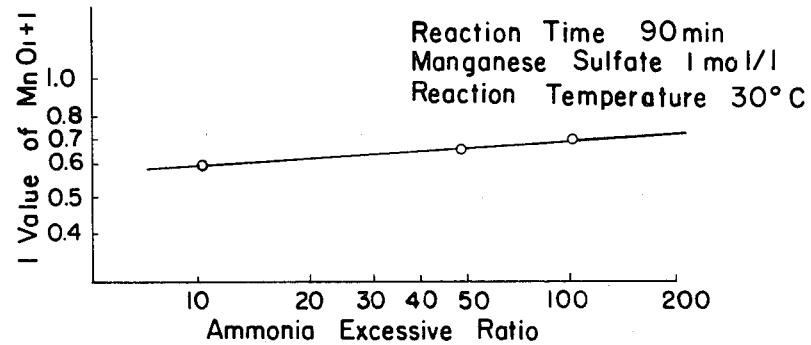
FIG. 3 is a graph on which the relationship between the $i$ values of the manganese oxide and the excess amount of ammonia for converting the manganese sulfate to manganese oxide and ammonium sulfate is plotted. The reaction temperature is 30°C, the time 90 min., and $MnSO_4$ concentration is 1 mole/liter.

Extensive experiments have demonstrated, that in respect to the reaction conditions, even readily available inexpensive oxygen sources, such as air, may be used as oxidizing agents. It has been ascertained that the activated hydrated manganese oxide can be readily and successfully obtained by selecting suitable reaction conditions, as shown in FIGS. 2 and 3. According to the results as plotted in these figures, by adding an excess of ammonia over the theoretical amount, superior results are obtained. Further, by maintaining the reaction temperature below 45°C, preferably in a range of 10 to 40°C, and by carrying out the oxidation with oxygen or an oxygen-containing gas, such as air in the form of fine bubbles of 0.2 to 5.0 millimeter diameter, superior results in respect to the formation of the hydrated manganese oxide are obtained. The fine bubbles for the oxygen or the oxygen-containing gas may be obtained by passing the gas through a porous plate or other suitable dispersing means.

In the above formula, the oxygen content in the manganese oxide has been indicated by the subscript $1+i$, while the water content of the hydrated manganese oxide has been indicated as $X\,H_2O$. In accordance with this invention, $i$ in these formulae should be between 0.5 to 0.8 so that the total amount of oxygen in the formula $MnO$ will be 1.5 to 1.8, while the $X$ in $X\,H_2O$ should be about between 0.1 to 1.0 If the reaction conditions mentioned hereinabove are adhered to, these preferred $i$ and $X$ values can be obtained within 1 to 2 hours of regeneration. It has been ascertained that hydrated manganese oxide of the indicated formula has extraordinarily advantageous absorbing capacity in respect to $SO_2$ and $SO_3$.

It has also been ascertained that the concentration of the ammonium sulfate in the reaction system does not significantly affect the composition of the activated hydrated manganese oxide finally obtained. This means that an active hydrated manganese oxide of the indicated composition can be obtained even if the solution of manganese sulfate contains about 20% of ammonium sulfate. As previously set forth, the ammonium sulfate produced in the process may be recycled to the leaching bath, as indicated by reference numeral 7 in FIG. 1, to facilitate the leaching of the solid manganese sulfate. Therefore, whether the manganese sulfate solution is oxidized in the presence or in the absence of ammonium sulfate is of no significance in respect to the final composition of the manganese oxide. However, addition of ammonium sulfate solution to the leaching step is preferred — in economical aspect as follows: —

It will be appreciated that the ammonium sulfate can be obtained in the inventive process in commercial quantities by raising the concentration of the ammonium sulfate in the solution which is ultimately stored in the tank 50. Since the ammonium sulfate is recirculated, its concentration will gradually build up until it is sufficiently high to warrant commercial exploitation.

The activated hydrated manganese oxide of this invention includes what is referred to as "unknown A-type" and "unknown Y-type" in admixture with one-another, produced by adding an aqueous solution of manganese sulfate to an aqueous solution containing ammonia in excess (preferably) of chemical equivalent at which reaction with the manganese sulfate occurs and by rapidly oxidizing due to the blowing of pressurized air or oxygen at normal pressures through perforated plates, as indicated by the following relation: $Mn_3O_4$ is converted to "hydrohausmannite" which is converted to $\gamma$-$Mn_2O_3.H_2O$ which is converted to $\alpha$-MnOOH which is converted to "unknown Y" a part of which is converted to "unknown A", the latter two comprising the activated hydrated manganese oxide absorbant of the process of this invention. The above beginning, intermediate, and final products, as examined by an electron microscope, are characterized as illustrated in Table I, and the $n$-value also given — as a ratio of oxygen atoms to manganese atoms in the actual molecule thereof:

TABLE 1

| Compound | n-value | Observed microscopic particle shape |
|---|---|---|
| $Mn_3O_4$ | 1.30 – 1.43 | fine particles |
| Hydrohausmanite | 1.38 – 1.45 | fine particles |
| $\gamma$-$Mn_2O_3.H_2O$ | 1.47 – 1.48 | needle-shaped |
| $\alpha$-MnOOH | 1.51 – 1.58 | agglomerated |
| "unknown Y" | 1.51 – 1.63 | string or plate |
| "unknown A" | 1.66 – 1.79 | foil |

Further explanations:

a. Regarding $Mn_3O_4$, its intensity of X-ray diffraction is very low, as compared with that of $Mn_3O_4$-hausmanite prepared by baking a compound of manganese at a temperature of 1000°C. Further, its diffraction angle and its strength ratio with respect to peak diffraction are equal to those shown in ASTM cards. Further, a small quantity of crystal water is contained.

b. Hydrohausmannite has the same diffraction angle and the same strength ratio as those shown in ASTM cards. The same applies in the case of $\gamma$-$Mn_2O_3.H_2O$.

c. The product $\alpha$-MnOOH is the same as MnOOH, a final product obtained in slow oxidation using air at normal (usual atmospheric) pressures. This is in contrast to the pressurized rapid oxidation of the invention.

d. It is known that manganese oxides found between $MnO_{1.6}$ and $MnO_2$ are Mn (II) — manganite and $MnO_{1.88}$. But, both the unknown Y and the unknown A are different from these in respect of X-Ray diffraction pattern. Further, both of them have other patterns from those of manganese oxide shown in ASTM cards. Accordingly, the activated hydrated manganese oxide absorbent composition is utterly new.

In the X-ray diffraction patterns of the unknown Y and the unknown A, only a peak diffraction is found.

In view of this fact, it is not possible to determine their crystal structures. These compositions are called unknown Y and A manganese oxides since they have such peculiar patterns. These are merely arbitrary names.

It can be said that the activated manganese oxide composition of the invention has a complicated structure consisting of bivalent, trivalent and tetravalent manganese atoms accompanied by oxygen atoms, hydroxyl groups, and water molecules. The activated hydrated oxide is a so-called non-stoichiometric compound in which holes due to escape of manganese atoms exist, and is not a mixture of compounds such as $Mn_2O_3$, and/or $MnO_2$. Accordingly, the above-noted characterizing formula of the activated hydrated manganese oxide of this invention has been arrived at.

With regard to the absorption capacity of the inventive use of the activated hydrated manganese oxide of this invention in removing sulfur dioxide from a contaminated gas, Tables 2 and 3 both illustrate the new use as well as make possible a comparison of the high absorption capacity with the inferior absorption capacities of prior manganese oxides employed as absorbant.

TABLE 2

| Absorbent | Rate of $SO_2$ removal (%) | Remarks |
|---|---|---|
| Activate hydrated manganese oxide (of the invention) | 85 | Produced according to the present invention. |
| $\gamma$-$MnO_2$ | 9.5 | Electrolytic manganese oxide. |
| $\gamma$-$Mn_2O_3.H_2O$ | 15 | Monohydrated $Mn_2O_3$. |
| Manganese ores | 2 – 8 | Ores: (1) pyrolusite; (2) rhodochrosite |
| $MnO_{1.88}$ | 63 | Prepared according to the example in U.S. Patent No. 3,150,923 |
| $\gamma$-$Mn_2O_3$ | 24 | Prepared according to the example in U.S. Patent No. 3,150,923 |

The Table 2 determinations were made under tests conditions and with apparatus as follows: Apparatus: The apparatus employed for suspending the absorbent and obtaining the absorption of $SO_2$ gas was as follows: An absorbent feeder fed angularly downwardly into an upwardlyextending riser conduit a fine feed of absorbent particles; in counter-flow upward direction through the riser conduit a flow of the sulfur oxide-containing gas fluidizes the absorbent and directs it through a continuing downward conduit. After a predetermined fluidized contact time, the conduit terminates at a cyclone for removing the suspended absorbent while a gas-leadoff tube extending from a central upward space about within the cyclone, and having the tube entrance directed toward about the base of the cyclone, leads-off the absorbent-free gas away from the cyclone absorbent-collector.

Reaction conditions were as follows:
Riser: 25 mm in diameter x 3,000 mmH
Downward pipe: 100 mm in diameter x 3,000 mmH
Gas : Heavy oil combustion waste gas
Flow rate of gas: 100 nl/min.
Temperature (inlet): 150°C
$SO_2$ Concentration (inlet): 2,000 p.p.m.
Flow rate of Absorbent (Mn/$SO_2$ molar ratio): 8 mol/mol
Solid-Gas Contact Period: 11 sec.

TABLE 3

| Absorbent | Rate of Reaction (mol %) | Bulk Specific Gravity(g/cc) | Specific Area of Surface(m²/g) | Remarks |
|---|---|---|---|---|
| $\beta$-$MnO_2$ | 3.2 | 2.88 | | |
| $\gamma$-$MnO_2$ | 12.8 | 2.16 | | |
| $\alpha$-$Mn_2O_3$ | 1.2 | 2.88 | | |
| $Mn_3O_4$ | 2.2 | 1.13 | | |
| $MnO_{1.88}$ | 59 | 0.29 | | U.S. Patent 3,150,923 |
| $Mn_3O_4$ | 24 | 1.2 | 36 | intermediate products (refer to this specification hereinabove) |
| Hydrohausmannite | 31 | 0.58 | 83 | |
| $\gamma$-$Mn_2O_3 \cdot H_2O$ | 39 | 0.44 | 86 | |
| $\alpha$-$MnOOH$ | 46 | 0.50 | 89 | |
| unknown Y | 53 | 0.40 | 110 | |
| unknown A | 60 | 0.46 | 210 | |

Test conditions are as follows:
Inlet Gas Composition:
$SO_2$ : 4400 ppm.
$O_2$ : 5 vol%
$H_2O$ : 12 vol%
$N_2$ : rest
Gas flow rate: 230 ml/min.
Temperature in Pipe : 120°C
Absorbing Period : 3 hrs.
Quantity of Sample : 1 g.

Apparatus: A fixed-bed absorption apparatus employed for the tests resulting in the Table 3 data is as follows: Surrounded by an electric furnace, a fixed-bed container channels a feed gas into a base-space of the container upwardly through a container-enclosed and container-supported bed, upwardly first through a glass-wool layer, next upwardly through a quartz-sand bed layer, upwardly through a layer of mixed absorbent and quartz-sand, upwardly through a second quartz-sand layer, and finally upwardly through a top-layer of glass wool; the cleansed gas is then channeled through an outlet to a suitable gas collector. A thermocouple of the furnace extends into the upper space above the top layer of glass wool.

The invention, with reference to the accompanying FIG. 1, will now be described by several Examples, it being understood, however, that these Examples are given by way of illustration and not by way of limitation and that many changes may be carried out without effecting in any way the scope and spirit of the invention as recited in the appended claims.

EXAMPLE I

Waste gas was subjected to the inventive gas purification treatment in a plant corresponding to that represented in FIG. 1 under the following conditions and with the following results:

APPARATUS

The apparatus of FIG. 1 contains two continuous two-step bubble-type oxidizing columns 23, designated columns A and B (A and B not separately illustrated). In a first column (A), air is fed at the bottom to form fine bubbles by means of bubble-dispersing plates. Thereby, oxidation is promoted. A mixture liquid of reaction products and solution is initially fed into an upper space of the column (A) and the remaining portion which reaches the bottom of the column (A) without being subjected to reaction is fed in series to a second column (B) into about the top, and out of about the bottom thereof (B) the manganese oxide and ammonium sulfate are channeled off. Into the bottom of the second column (B) -- as with the first column (A) -- pressurized air is fed, for completing the oxidation, bubbling upwardly through the column. The oxidizing columns are each equipped with cooling jackets; 380 mm in diameter × 4.00 mm H-2 sets, for the two columns. A gas dispersing plate (porous plate) is provided at the lower part of the oxidizing column (bubble type). In A type, the pore diameter of the porous plate is selected small (about 1 mm) to facilitate the formation of fine bubbles, while in B type, the pore diameter is relatively large.

TEST CONDITIONS

Concentration of manganese sulfate solution: 1.4 mol/l; flow rate: 100 l/hr; concentration of ammonia: 5.6 mol/l; reaction temperature: 20°C; average retention time: 2 hrs. (through two columns); gas dispersing plate: A-type (course bubble generating type); oxygen gas: 90 – 95% in purity; flow rate: 450 – 500 N l/hr. The term "average retention time" means average time for which the mixture stays in the columns (A and B). The symbol "mol/l" means "moles per liter".

| Qualities of obtained manganese oxide: | |
|---|---|
| Composition: | $MnO_{1.72} \cdot 0.8H_2O$ |
| Bulk density: | $0.337 g/cm^3$ |
| Surface area: | $135 m^2/g$ |
| Ammonium sulfate solution obtained as by-product: | |
| Concentration: | 35 wt.% |
| No Mn and other impurities were detected. | |
| Absorption test: | |
| (1) Apparatus: | Fixed bed type, grain size 8-24 mesh |
| | Space velocity: 1000 l/hr |
| Gas: | Heavy oil combustion gas ($SO_2$:0.3, $O_2$:2.5, $CO_2$:12.5, $H_2O$:8.5, and balance $N_2$ by volume %) at 130°C. |
| (2) Results of absorption test: | |
| Apparatus: | Dilute Fluidized bed type |
| Gas: | Heavy oil combustion boiler flue gas: 3000 $Nm^3$/hr. |
| | Gas temperature at inlet of apparatus 125°C; |
| | $SO_2$:0.1 vol.%; |
| Absorbent: | Having the above quality, 308 kg/hr. Solid gas contact time 8 sec. |
| Test Result: | $SO_2$ removing ratio 100% |

EXAMPLE II

The same equipment as described in connection with Example I was employed except that a B-type gas dispersing plate for generating fine bubbles was used. The results were as follows:

Test Conditions
Concentration of manganese sulfate: 1.4 mol/l;
Flow rate: 110 l/hr. Reaction temperature: 30°C;

| Reaction time (min.) | 0 | 10 | 20 | 30 | 40 | 50 | 60 |
|---|---|---|---|---|---|---|---|
| Mn++ (mol/l.) | 1.4 | 0.9 | 0.7 | 0.2 | 0.02 | — | — |

Average retention time: 2 hrs. (through two columns);
Gas dispersing plate: B-type (fine bubbles generating type);
Oxygen gas 90 – 95% in purity. Flow rate: 450 – 500 l/hr.
Quality of produced manganese oxide:
Composition: $MnO_{1.68} \cdot H_2O$; Bulk density: 0.625 g/cm³
Surface area: 125 m²/g
Ammonium sulfate solution obtained as by-product:
Concentration: 35% by weight.
No Mn and other impurities were detected.
Absorption test results:
Apparatus: Dilute Fluidized bed type; pulverized absorbent was fed into the top side of a horizontal tube carrying $SO_2$-contaminated gas under pressure being passed through the tube which thereafter includes a vertical extending tube followed for upward flow followed by a second vertical tube for downward flow, after which the tube leads to a dust collector from which pulverized absorbent is channeled downwardly and from which clean gas is channeled upwardly from a central space within the collector.

| | |
|---|---|
| Gas: | Heavy oil combustion boiler flue gas: 3000 Nm³/hr; gas temp. at inlet of apparatus: 125° C $SO_2$: 0.1 vol.% |
| Absorbent: | Having the quality as above; 310 kg/hr Solid-gas contact time 8 sec. |
| Test result: | $SO_2$ removing ratio: 95% |

(3) The purity of the ammonium sulfate obtained by the process of this invention is very high, since the oxidation is carried out in an alkaline state and therefore impurities, such as manganese, iron and other heavy metals, are transferred into the solid phase as hydroxides of a very small solubility. Experimental results indicated that no impurities were present. The amount of manganese in the solution decreases as a function of time as follows:

EXAMPLE III:

| A. Absorption apparatus: | Dilute Fluidized bed type solid-gas contact apparatus consisting of an upward current tube (25 mm in diameter × 3000 mmH) and a downward current tube (100 mm in diameter × 3000 mmH) |
|---|---|
| B. Test conditions: | Heavy oil combustion waste gas; 100 Nl/min, 150°C at inlet, $SO_2$ concentration: 0.2 Vol% at inlet, Absorbent: quantity in mol ratio of $Mn/SO_2$ .... 8 mol/mol grading .... 150 micron or less Solid-gas contact time: 11 sec. |
| C. Test Results: | |

| Absorbent | $SO_2$ removing degree |
|---|---|
| Hydrated manganese oxide of the present invention | 85% |
| γ- $MnO_{1.88}$ (electrolytic manganese oxide) | 9.5% |
| γ- $Mn_2O_3 \cdot H_2O$ | 15% |
| Manganese ores (Pyrolusite, Rhodochrosite) | 2 – 8% |
| γ- $MnO_{1.88}$ (U.S.P. 3,150,923) | 63 % |
| γ- $Mn_2O_3$ (U.S.P. 3,150,923) | 24% |
| $MnCO_3$ | 8% |

Example IV, which shows comparative data of X-ray spectrum analysis:

EXAMPLE IV

| Y TYPE Manganese Oxide | | | A TYPE Manganese Oxide | | |
|---|---|---|---|---|---|
| 2 θ | d (A) | $I/I_{MAX}$ | 2 θ | d (A) | $I/I_{MAX}$ |
| 24.0 | 4.66 | 100 | 15.5 | 7.18 | 100 |
| 46.4 | 2.46 | 15ₚ | 46.4 | 2.46 | 10ₚ |

X-ray spectrum analysis disclosed that the hydrated manganese oxide of the present invention had a crystal structure different from those of the known manganese oxides ($\alpha, \beta, \gamma MnO_2$; $\alpha, \beta, \gamma Mn_2O_3$; $Mn_3O_4$; $\gamma MnOOH$, etc.,) being a novel compound expressed by the following formula:

$MnO_{1+i} \cdot XH_2O$; $i = 0.5 – 0.8$, $x = 0.1 – 1.0$.

X-ray spectrum analysis data of the manganese oxide of this invention are as follows:

REMARKS

Rad. Fe Kα
λ 1.9373
Filter Mn
$I/I_{MAX}$ Philips X-ray Diffractometer
In the case of $MnO_{1.88}$ as seen in U.S. Pat. No. 3,150,923, the results are as follows:

| Manganese Oxide $MnO_{1.88}$ | | REMARKS | |
| --- | --- | --- | --- |
| d (A) | $I/I_{MAX}$ | | |
| 6.99 | 25 | Rad. | FeKα |
| 4.91 | 25D | λ | — |
| 3.99 | 10D | Filter | — |
| 3.052 | 10D | $I/I_{MAX}$ | Visual |
| 3.132 | 75D | | |
| 2.755 | 10D | | |
| 2.392 | 100 | | |
| 2.152 | 75D | | |
| 3.036 | 10D | | |
| 1.633 | 25 | | |
| 1.542 | 50D | | |
| 1.425 | 50 | | |
| 1.368 | 25D | | |
| 1.358 | 25D | | |
| 1.348 | 25D | | |

In comparing the test results of both cases, it is found that the latter, $MnO_{1.88}$ has more lines of diffraction and accordingly more atomic planes and thus there is a difference in arrangement of manganese atoms between $MnO_{1.88}$ and activated manganese oxide (Y-type and A-Type); that the strength of line of diffraction in $MnO_{1.88}$ has a maximum at a value of distance between the atomic planes $d = 2.392A$ while that in A-type activated manganese oxide has a maximum at $d = 7.18A$ and in Y-type at $d = 4.66A$ (if the latter is identical with the former, then their strongest lines of diffraction are to appear at one and the same value of $d$); and that there is a remarkable difference in the value of $d$ between $MnO_{1.88}$ and the activated manganese, through an allowable error in the value $d$ is at largest in the range of $\pm 0.01A$.

It is thus concluded that there is a clear difference in crystal structure between $MnO_{1.88}$ and the activated manganese oxide (A - and Y-types).

As is known, if manganese hydroxide is oxidized with oxygen gas in accordance with prior art processes, the oxidation product is generally in the form of a fine precipitate which renders the subsequent solid-liquid separation extremely difficult. By contrast, in accordance with the process of the present invention, no such difficulties are encountered, and the manganese oxide which is formed can be readily and easily separated by usual separating devices, such as vacuum filter centrifuge or filter press, which renders the operation easy and reduces the cost of the equipment and installation.

An additional merit and advantage of the inventive procedure is that since ammonia is recovered by heating the residual liquid which is obtained after separation of the hydrated manganese oxide, the solution is concentrated in the heating step and hence an ammonium sulfate solution of high concentration is obtained as will be appreciated from the values indicated in Example I.

If an oxygen-containing gas is used in the process of this invention, as the oxidizing agent, instead of circulating oxygen proper, the same results can be obtained by maintaining the partial pressure of the oxygen in the oxidation column at a value which is higher than about 1 atmosphere.

While specific embodiments of the invention have been shown and described in detail to illustrate the application of the principles of the invention, it will be understood that the invention may be embodied otherwise without departing from such principles.

What is claimed is:

1. A manganese oxide composition consisting essentially of at least one activated manganese oxide of the formula $MnO_{1+i} \cdot XH_2O$ wherein $i$ is a number from about 0.5 to about 0.8 and X is a number from about 0.1 to about 1.0, said manganese oxide being in the form of microscopic particles of said activated manganese oxide wherein said particles have the form of at least one of (a) string shape, (b) plate shape, and (c) foil shape, and further wherein said particles have from 4.6 Angstrom units to 7.18 Angstrom units distance between atomic planes at maximum diffraction strength of line.

2. A composition according to claim 1, wherein $i$ is a number from 0.51 to 0.63 and the particles are in form of at least one of string and plate shapes.

3. A composition according to claim 1, wherein $i$ is a number from 0.66 to 0.79 and the particles are in the form of foil shapes.

4. A composition according to claim 1, wherein $i$ is about 0.72, X is about 0.8 and the manganese oxide composition has a bulk density of about $0.337g/cm^3$ and a surface area of about $135m^2/g$.

5. A composition according to claim 1, wherein $i$ is about 0.68, X is about 1.0 and the composition has a bulk density of about $0.625g/cm^3$ and a surface area of about $125m^2/g$.

6. A composition according to claim 1, wherein the distance between atomic planes is 4.66 Angstrom units.

7. A composition according to claim 1, wherein the distance between atomic planes is 7.18 Angstrom units.

8. A continuous process of making a solid particulate hydrated manganese oxide absorbent of the formula $MnO_{1+i} \cdot XH_2O$, wherein $i$ stands for a number between 0.5 to 0.8 and X stands for a number between 0.3 and 1.0, which comprises
   a. dissolving manganese sulfate, in a solvent selected from water and aqueous ammonium sulfate,
   b. continuously admixing the manganese sulfate solution thus obtained in (a) with ammonia,
   c. continuously oxidizing the solution thus obtained in (b) with an oxidizing agent in the form of fine bubbles of gas comprising oxygen of from about 0.2 to about 1.0 millimeter diameter, at a temperature of from about 10° to about 45°C., said oxidizing agent being selected from gaseous oxygen and an oxygen-containing gas,
   d. continuously recovering hydrated manganese oxide of the said formula and aqueous ammonium sulfate solution,
   e. separating the aqueous ammonium sulfate solution from said manganese oxide, and
   f. recovering the said hydrated manganese oxide.

9. A process as claimed in claim 8, wherein at least a portion of the separated aqueous ammonium sulfate solution is recycled to dissolve fresh manganese sulfate, the amount of ammonium sulfate which is recycled to dissolve the manganese sulfate being so chosen that a manganese sulfate solution containing more than 5% by weight of ammonium sulfate is formed, and the amount of ammonia which is added to said manganese sulfate solution being in excess of the amount necessary to convert said manganese sulfate into ammonium sulfate and manganese hydroxide.

10. A process as claimed in claim 9, wherein said ammonium sulfate solution obtained after separation of said manganese oxide is concentrated by heating, while liberating residual ammonia from the solution, the liberated ammonia is recycled to the manganese sulfate solution, and a portion of the concentrated ammonium sulfate solution obtained is withdrawn and recovered.

11. A process as claimed in claim 9, wherein a solid hydrated manganese oxide absorbent is recovered consisting essentially of manganese oxide of the formula $MnO_{1+i} \cdot XH_2O$ where $i$ stands for about 0.7 and X stands for a number from about 0.8 to about 1.0, whereby said hydrated manganese oxide absorbent is further characterized in that the said hydrated manganese oxide absorbent has a bulk density of from about 0.337g/cm³ to about 0.625g/cm³, and a surface area of from about 125m²/g to about 135m²/g.

* * * * *